US008533082B1

(12) United States Patent
Sudjianto et al.

(10) Patent No.: US 8,533,082 B1
(45) Date of Patent: *Sep. 10, 2013

(54) CONSUMER LEVERAGE MODELING

(75) Inventors: Agus Sudjianto, Matthews, NC (US); Jie Chen, Charlotte, NC (US); Meghan Alita Steach, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 549 days.

This patent is subject to a terminal disclaimer.

(21) Appl. No.: 12/541,728

(22) Filed: Aug. 14, 2009

(51) Int. Cl.
*G06Q 40/00* (2012.01)
(52) U.S. Cl.
CPC ........................... *G06Q 40/00* (2013.01)
USPC .......................................................... 705/35
(58) Field of Classification Search
USPC .......................................................... 705/35
See application file for complete search history.

(56) References Cited

U.S. PATENT DOCUMENTS

| 6,866,973 | B2* | 3/2005 | Maehara ........................ 430/18 |
| 6,907,403 | B1* | 6/2005 | Klein et al. ................. 705/36 R |
| 7,991,666 | B2* | 8/2011 | Haggerty et al. ............... 705/35 |
| 8,099,356 | B2* | 1/2012 | Feinstein et al. ................ 705/38 |
| 2001/0011245 | A1* | 8/2001 | Duhon ............................ 705/38 |
| 2006/0212386 | A1* | 9/2006 | Willey et al. .................... 705/38 |
| 2007/0100719 | A1* | 5/2007 | Chwast et al. ................... 705/35 |
| 2007/0203827 | A1* | 8/2007 | Simpson et al. ................. 705/38 |
| 2008/0222015 | A1* | 9/2008 | Megdal et al. .................. 705/35 |
| 2009/0144160 | A1 | 6/2009 | Haggerty et al. |
| 2009/0327036 | A1* | 12/2009 | Ports et al. ...................... 705/10 |
| 2010/0076813 | A1* | 3/2010 | Ghosh et al. .................... 705/10 |

OTHER PUBLICATIONS

Utility U.S. Appl. No. 12/651,666, filed Jan. 4, 2010.

* cited by examiner

*Primary Examiner* — Bruce I Ebersman
(74) *Attorney, Agent, or Firm* — Michael A. Springs; Moore & Van Allen PLLC; Padowithz Alce

(57) ABSTRACT

Embodiments of the present invention relate to systems, methods and computer program products that model consumer leverage and provide a leading indicator that predicts increases or decreases in consumer net non-collectibles. To do so, for example, the present invention determines the growth of consumers' spending and borrowing, and tracks a relationship between the value of a ratio that compares consumers' spending and borrowing and the value of the equilibrium of the ratio that compares consumers' spending and borrowing. This relationship is then applied to predict changes in consumers' ability to repay borrowed funds and consumer net non-collectibles.

20 Claims, 4 Drawing Sheets

US 8,533,082 B1

CONSUMER LEVERAGE MODELING

FIELD

In general, embodiments of the present invention relate to systems, methods and computer program products for modeling consumer leverage and predicting consumer net non-collectibles.

BACKGROUND

A non-collectible is a declaration by a creditor, such as a credit-card issuer, that an amount of debt is unlikely to be collected. For example, credit-card issuers often make the decision to declare that an uncollected credit-card debt to be non-collectible after six months of non-payment. Net non-collectible is the gross amount of debt declared to be non-collectible, less recoveries collected from earlier non-collectibles. For example, if a credit-card holder fails to repay on its $10,000 credit-card balance, the credit-card issuer can record a $10,000 loss. However, if the credit-card issuer later collects $3,000 from the credit-card holder that is failing to repay, then the net non-collectibles on the debt is $7,000, not $10,000 as originally recorded.

In an effort to reduce non-collectibles, financial institutions often rely on economic indicators. More credit is issued to consumers when economic indicators are good. Less is issued when they are bad. Methods for developing and applying economic indicators continuously evolve and vary from institution to institution and from financial market to financial market.

Generally speaking, an economic indicator is a statistic used to analyze characteristics of a particular market. Economic indicators fall into three broad categories: lagging, coincident, and leading. Lagging indicators are economic indicators that react slowly to economic changes, and therefore provide little predictive value. Generally lagging indicators follow an event because they are historical in nature. Lagging indicators demonstrate how well a market has performed in the past. This gives economists a chance to review their predictions and make better forecasts. For example, the unemployment rate is traditionally characterized as a lagging indicator. This is because unemployment represents previous personnel decisions and, as such, always lags behind current market conditions. For example, during the mid-1990s there was a spike in consumer credit losses in the United States, despite decreasing unemployment. Profit is another exemplary lagging indicator, because profits reflect historical performances. Similarly, customer satisfaction is an economic indicator that indicates historical performance.

Coincident indicators are economic indicators that change at approximately the same time and in the same direction as the relevant market. This provides information about the current state of the market. For example, personal income, GDP, and retail sales are coincident indicators. Coincident indicators are often used to identify, after the fact, the dates of peaks and troughs in the economy or sectors of the economy.

Leading indicators are economic indicators that predict changes in the market. A leading indicator is one that changes before the market changes. Examples of leading indicators include stock prices, which often improve or worsen before a similar change in the market. Other leading indicators include the index of consumer expectations, building permits, and money supply.

Known economic indicators and methods of applying those economic indicators have yet to reliably and consistently predict changes in consumer non-collectibles. Such predictions would enable financial institutions to save billions of dollars by effectively and timely issuing and retracting credit. For example, financial institutions could issue more credit when net non-collectibles are predicted to decrease and less when net non-collectible are predicted to increase.

SUMMARY

Embodiments of the present invention relate to systems, methods and computer program products that model consumer leverage and provide a leading indicator that predicts increases or decreases in consumer net non-collectibles. To do so, for example, the present invention determines the growth of consumers' spending and borrowing, and tracks a relationship between the value of a ratio that compares consumers' spending and borrowing and the value of the equilibrium of the ratio that compares consumers' spending and borrowing. This relationship is then applied to predict changes in consumers' ability to repay borrowed funds and consumer net non-collectibles.

A brief summary of an exemplary embodiment of the present invention will now be provided. According to this exemplary embodiment, the present invention receives spending and borrowing data across a plurality of consumers. For purposes of this example, the spending data is taken across the entire United States and represents consumers' aggregated monthly spending, including, for example, expenditures on durable goods, consumer products, and services. The borrowing data, too, is taken across the entire United States but represents consumers' aggregated monthly revolving credit outstanding. Revolving credit is a type of credit that does not have a fixed number of payments, in contrast to installment credit. Revolving credit outstanding represents the value of funds drawn against revolving credit. Examples of revolving credits used by consumers include credit cards. Accordingly, for purposes of this example, borrowing data reflects amounts consumers draw against revolving credit accounts.

After receiving the spending and borrowing data, the present invention, according to this example, determines the growth rate of consumers' monthly spending and the growth rate of consumers' monthly borrowing. The present invention then normalizes a ratio that compares the growth rate of consumers' monthly borrowing and the growth rate of consumers' monthly spending. The values associated with the normalized ratio are referred to as actual values. Next, the present invention determines the best logistic equilibrium of the ratio that compares the actual growth rate of consumers' monthly borrowing and the actual growth rate of consumers' monthly spending. The values associated with the equilibrium of the ratio are referred to as equilibrium values.

Next, the present invention models consumer leverage and compares the actual values and the equilibrium values over time. If the actual values are greater than the equilibrium values, then the present invention indicates that consumer leverage is increasing, that consumers' ability to repay borrowed funds will decrease, and that consumer net non-collectibles will increase in the future. However, if the actual values are less than the equilibrium values, then the present invention indicate that consumers are deleveraging, that consumers' ability to repay borrowed funds will increase, and that consumer net non-collectibles will decrease in the future.

In some embodiments, a method is provided that comprises receiving data taken across a plurality of consumers. The data comprises a total spending amount and a total debt amount. The method further comprises using a processor to: determine a value of a ratio that compares an actual growth rate of the total debt amount and an actual growth rate of the total spending amount; determine a value of an equilibrium of the ratio that compares the actual growth rate of the total debt amount and the actual growth rate of the total spending amount; compare the value of the ratio to the value of the equilibrium of the ratio; if the processor determines that the value of the ratio is greater than the value of the equilibrium of the ratio, providing an indication that consumer leverage is increasing and providing an indication that consumer net non-collectibles will increase; and if the processor determines that the value of the ratio is less than the value of the equilibrium of the ratio, providing an indication that consumer leverage is decreasing providing an indication that consumer net non-collectibles will decrease.

In some embodiments, a system is provided that comprises a database for storing data taken from a plurality of consumer. The data comprises a total debt amount and a total spending amount. A processor is associated with the database and configured to execute an application for prediction consumer net non-collectibles. The application executed by the processor is configured to: determine a value of a ratio that compares an actual growth rate of the total debt amount and an actual growth rate of the total spending amount; determine a value of an equilibrium of the ratio that compares the actual growth rate of the total debt amount and the actual growth rate of the total spending amount; compare the value of the ratio to the value of the equilibrium of the ratio. If the value of the ratio is greater than the value of the equilibrium of the ratio, the processor is configured to provide an indication that consumer net non-collectibles will increase. If the value of the ratio is less than the value of the equilibrium of the ratio, the processor is configured to provide an indication that consumer net non-collectibles will decrease.

In some embodiments, a computer program product is provided. The computer program product is configured to predict consumer net non-collectibles and comprises a computer-readable medium having computer-readable program instructions stored therein. The computer-readable program instructions comprise first instructions configured to receive data taken across a plurality of consumers, where the data comprises a total spending amount and a total debt amount. The computer-readable program instructions further comprise: second instructions configured to determine a value of a ratio that compares an actual growth rate of the total debt amount and an actual growth rate of the total spending amount; third instructions configured to determine a value of an equilibrium of the ratio that compares the actual growth rate of the total debt amount and the actual growth rate of the total spending amount; fourth instructions configured to compare the value of the ratio to the value of the equilibrium of the ratio; fifth instructions configured to provide an indication that consumer net non-collectibles will increase if the value of the ratio is greater than the value of the equilibrium of the ratio; and sixth instructions configured to provide an indication that consumer net non-collectibles will decrease if the value of the ratio is less than the value of the equilibrium of the ratio.

BRIEF DESCRIPTION OF THE DRAWINGS

Figure 1:
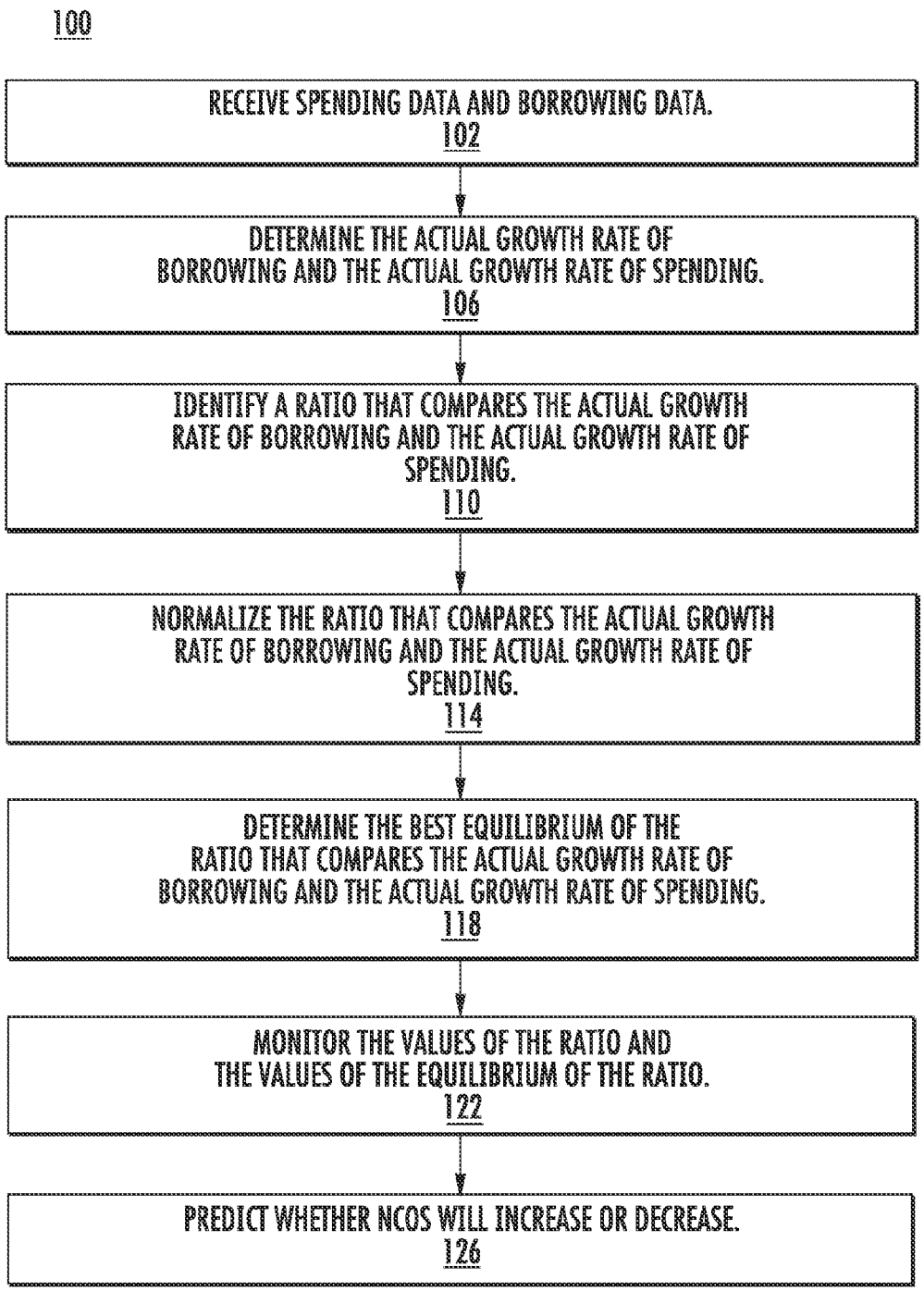
Figure 2:
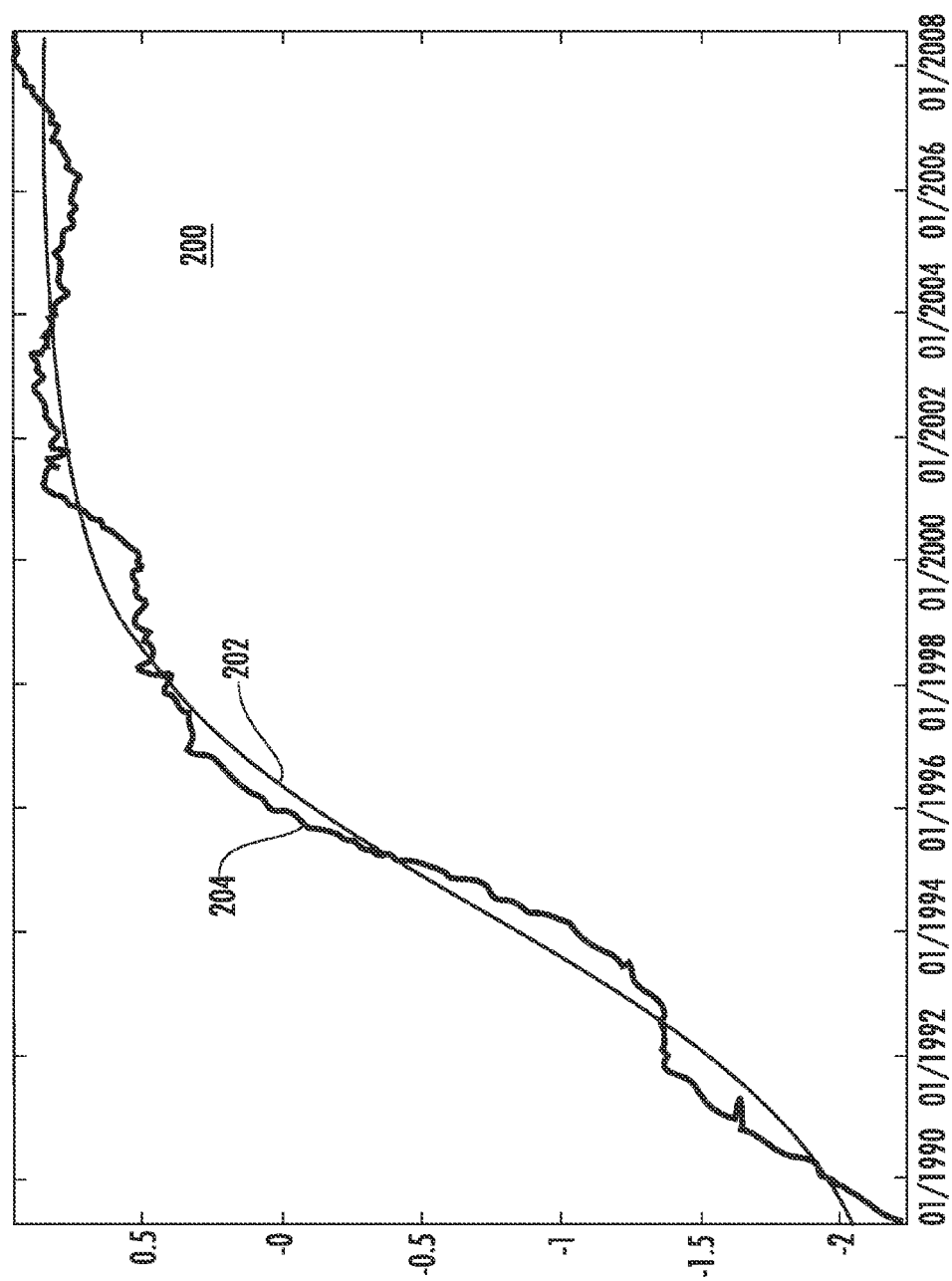
Figure 3:
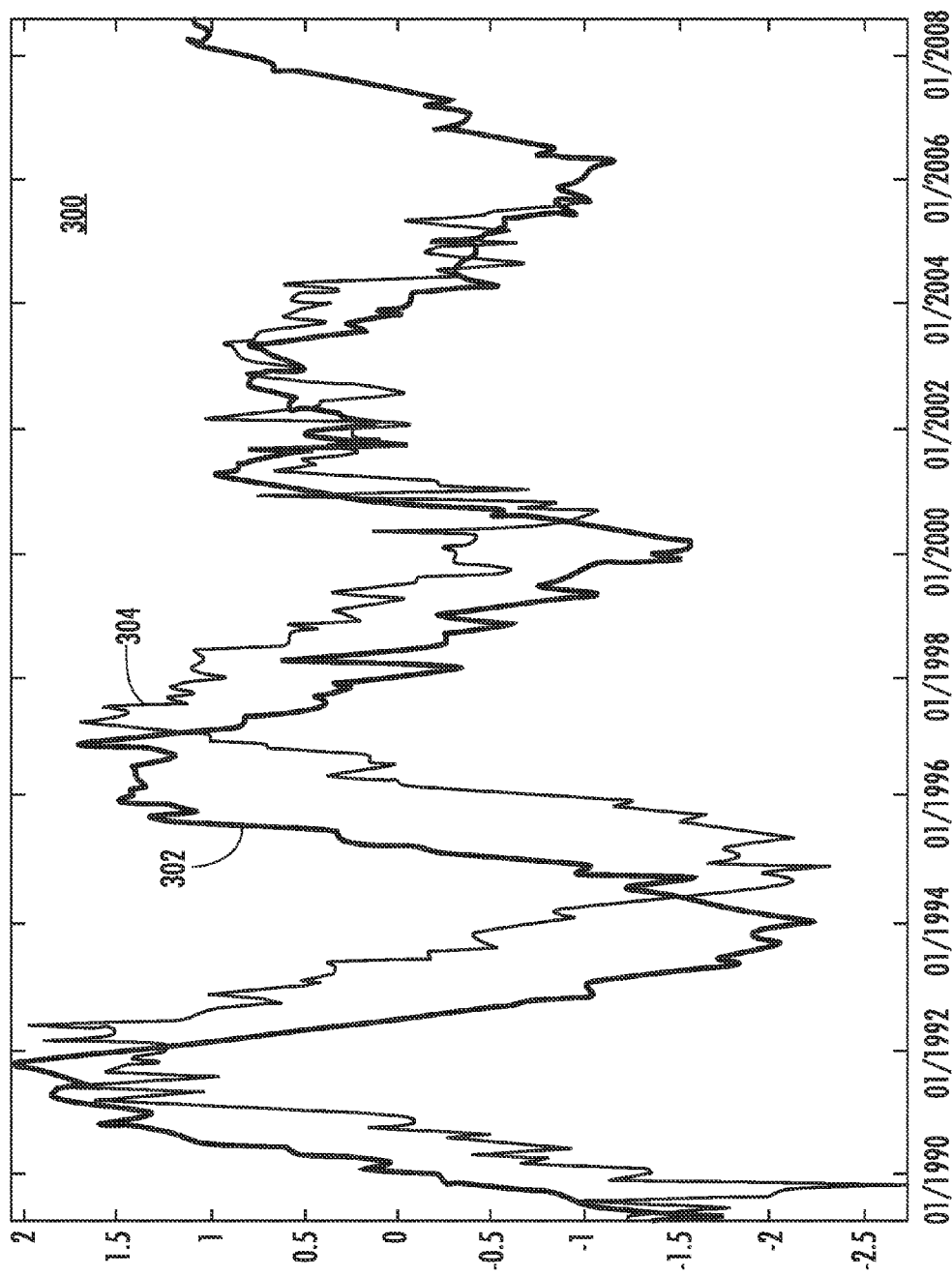
Figure 4:
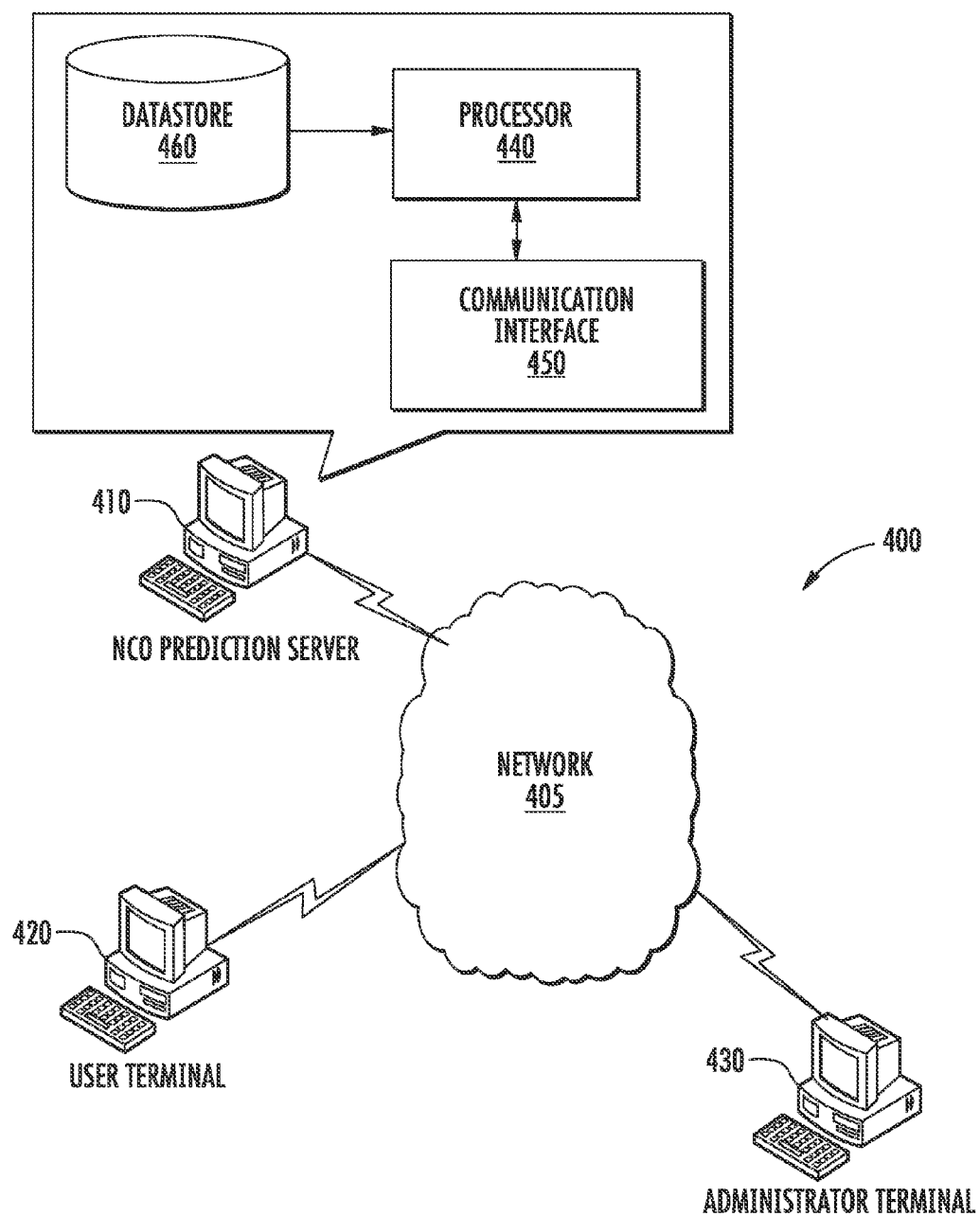

Having thus described embodiments of the invention in general terms, reference will now be made to the accompanying drawings wherein:

FIG. 1 is a flow chart illustrating an exemplary process of monitoring changes in consumer spending and borrowing to predict changes in consumer net non-collectibles, according to an embodiment of the present invention;

FIG. 2 is an exemplary consumer leverage model having a curve that represents the normalized value of a first ratio and another curve that represents the normalized value of a second ratio, where the first ratio compares the equilibrium growth rate of consumers' monthly borrowing and spending and where the second ratio compares the actual growth rate of consumers' monthly borrowing and spending, according to an embodiment of the present invention;

FIG. 3 is an exemplary chart that provides a curve that represents a relationship between the first and second ratios and another curve that represents detrended net non-collectibles, according to an embodiment of the present invention; and FIG. 4 illustrates an environment in which the processes described herein are implemented, according to an embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

For illustrative convenience, embodiments of the present invention will be described herein as being used by any institution or business or non-business entity or portion thereof to evaluate consumers' ability to repay funds withdrawn from revolving credit accounts and predict whether consumer net non-collectibles will increase or decrease in the near future. It should be appreciated, however, that other embodiments of the present invention could be applied to evaluate consumers' ability to repay other debts, such as mortgages and other installment credits with a fixed number of payments. Embodiments of the present invention evaluate consumers at a national level, using transaction data provided from government and non-government entities that collect nationwide spending data and borrowing data. The term "spending data" as used herein refers to data that indicates the value of goods and services consumed. The term "borrowing data" as used herein refers to data that indicates the value of funds consumers withdraw from revolving credit accounts.

Outputs from embodiments of the present invention can be used by financial institutions to adjust their credit risk exposure. For example, if the present invention predicts that consumers' ability to repay outstanding credit will decrease and that net non-collectibles will increase, then financial institutions can reduce their risk exposure by issuing less credit or by retracting already issued credit. Likewise, if the present invention predicts that consumers' ability to repay outstanding credit will increase and that net non-collectibles will decrease, then financial institutions can issue more credit.

FIG. 1 provides a flow diagram illustrating an exemplary process 100 for constructing and using consumer leverage model to track consumers' ability to repay debts and predict changes in consumer net non-collectibles by: receiving spending data and borrowing data from across a large number of consumers; determining a first ratio that compares equilibrium borrowing growth rates and equilibrium spending growth rates; and determining a second ratio that compares actual borrowing growth rates and actual spending growth rates.

As represented by block 102, the process 100 generally begins with receiving spending data and borrowing data. Spending data, according to some embodiments, is data that indicates the value of goods and services consumed. In an embodiment, spending data is received on a monthly basis from the Bureau of Economic Analysis, an agency of the U.S. Department of Commerce, in the form of a monthly report that outlines the month's personal consumption expenditures. The report provides the actual and imputed monthly expenditures of all households in the United States. In other words, the monthly report includes spending data that represents the value of funds spent on goods and services targeted for individual consumption. This value is referred to herein as PCE.

The borrowing data is data that indicates the value of funds consumers withdraw from revolving credit accounts. The United States Federal Reserve Board collects data that represents total amounts of consumer credit outstanding. This data includes revolving credit and non-revolving credit. Revolving credit is composed mostly of credit card loans, but also includes some lines of credit, such as checking account overdraft protection. Non-revolving credit includes automobile loans and all other loans not including in revolving credit, such as loans for education, boats, trailers, and vacations. In an embodiment, the present invention receives spending data on a monthly basis from the United States Federal Reserve Board in the form of a monthly report that provides a value that represents the total consumer revolving credit outstanding across the entire United States. This value is referred to herein as REV. REV does not include non-revolving credit outstanding. However, it should be appreciated that some embodiments of the present invention could receive and analyze non-revolving credit outstanding data and that REV could include non-revolving credit outstanding.

As represented by block 106, the process 100 further involves determining actual historical growth rates for consumer borrowing and for consumer spending. According to some embodiments, actual historical growth rates for consumer spending are determined using historical monthly PCEs, and actual historical growth rates for consumer borrowing are determined using historical monthly REVs. For example, actual historical growth rates for consumer borrowing can be determined by calculating rates of change between historical REVs, and actual historical growth rates for consumer spending can be determined by calculating rates of change between the historical PCEs.

The process 100 then involves identifying a ratio that compares the actual growth rate of consumer borrowing and the actual growth rate of consumer spending, as indicated at block 110. In some embodiments, the identified ratio that compares the actual growth rate of consumer borrowing and the actual growth rate of consumer spending is: log(REV)/log(PCE). After identifying this ratio, the process 100, as indicated by block 114, involves normalizing the ratio. Next, the process 100 involves searching for the best logistic equilibrium of the ratio, as indicated at block 118.

Referring now to FIG. 2, graph 200 provides a consumer leverage model having two curves 202, 204. Curve 202 is a smooth curve that represents the best logistic equilibrium of a ratio that compares the growth rate of consumer borrowing and consumer spending. In the illustrated embodiment, equilibrium curve 202 represents the equilibrium of log($REV_t$)/log($PCE_t$). As indicated by graph 200, curve 202 has a high, positive slope in the early to mid 1990s. However, the slope approaches zero in the mid to late 2000s. This is because creditors in the United States were really limited up until the early 1990s, but in the early to late 1990s the United States credit market went through a period of rapid growth, where spending and borrowing increased at a rapid rate. Lenders relied on credit scoring to be very aggressive. During this period the ratio of spending to borrowing increased dramatically, but this increase was okay because new borrowers were still getting absorbed and the market was still at equilibrium. However, in the 2000s, the growth matured because the credit market became saturated. This stabilized the growth rate of spending and borrowing.

Curve 204 represents the ratio that compares the growth rate for consumer borrowing and consumer spending, after the ratio has been normalized. In the illustrated embodiment, the curve 204 represents log($REV_t$)/log($PCE_t$), after normalization. The difference between the equilibrium curve 202 and the actual curve 204 at any particular time represents consumers' leverage and ability to repay debt. For example, between 1990 and 1992, the actual curve 204 was at a higher value than the equilibrium curve 202. As such, during that time, the growth in consumer borrowing exceeded the growth in consumer spending by an unsustainable rate. For example, each time consumers spent, they also borrowed. But they failed to repay the borrowed amounts before spending again. This behavior, where consumers were borrowing faster than they were spending, created pressure in the credit market.

This pressure was relieved in the middle of 1992 when the actual curve 204 dipped to values below those of the equilibrium curve 202. This relief came mostly in the form of credit card non-collectibles. During this time, credit was withdrawn from the market and, as a result, consumers were forced to spend using their income or wealth instead of credit. And because consumers were not leveraging debt to spend, growth in consumer spending exceeded growth in consumer borrowing.

As indicated in FIG. 2, curves 202 and 204 of the consumer leverage model predicted the economic downturns of the early 1990s, the early 2000s, and the late 2000s. Before each downturn, consumer spending was decreasing and borrowing was increasing. Thus, causing the actual curve 204 to rise to values above those of the equilibrium curve 202. Toward the end of each downturn, spending was still decreasing, but spending was decreasing at a slower rate than borrowing. This led to economic stabilization in each instance.

Referring now to FIG. 3, graph 300 provides two curves 302, 304. Curve 302 represents the difference between curves 202 and 204 of FIG. 2. This difference represents consumers' ability to repay debt. In other words, curve 302 represents the residual between the actual curve 204 and the equilibrium curve 202. For example, with reference to FIGS. 2 and 3, from 1990 to 1992, the actual curve 204 was above the equilibrium curve 202, and the residual curve 302 had a positive slope. On the other hand, from 1992 to 1994, the actual curve 204 was below the equilibrium curve 202, and the residual curve 302 had a negative slope.

Curve 304 represents detrended net non-collectibles, after normalization. Net non-collectibles are referred to herein as NCOs. The NCO curve 304 is constructed using NCO data that indicates the net value of uncollected funds that lenders are forced to declare non-collectable each month because consumers are unwilling or unable to repay. For example, NCO data can be obtained on a monthly basis.

As illustrated in FIG. 3, the NCO curve 304 continuously tracks the residual curve 302 with a lag time of five to twelve months. Accordingly, the present invention can use the residual curve 302 to predict the NCO curve 304 and thereby predict changes in NCOs and changes consumers' ability repay debt.

For example, when the slope of the residual curve 302 changes from positive to negative, the slope of the NCO curve 304 follows. As previously mentioned, the residual curve 302 represents the difference between the actual curve 204 and the equilibrium curve 202. When borrowing increases at a faster rate than spending, the actual curve 204 rises to values above those of the equilibrium curve 202 and thereby causes residual curve 302 to have a positive slope. This means NCOs will increase in the following months. However, when borrowing continues but spending increases such that is increasing faster than borrowing, the actual curve 204 begins dropping to values lower than those of the equilibrium curve 202 and the slope of the residual curve 302 changes from positive to negative. This means NCOs will begin to decrease in the following months.

Referring again to FIG. 1, after determining the equilibrium of the ratio that compares the actual growth rate of borrowing and the actual growth rate of spending, the process 100 involves monitoring the values of the ratio and the values of the equilibrium of the ratio, as indicated at block 122. Then, as indicated at block 126, the process 100 predicts whether NCOs will increase or decrease. For example, if, at the time of inquiry, the actual curve 204 is at a higher value than the equilibrium curve 202 and the residual curve 302 has a positive slope, then the process 100 predicts that NCOs will increase and consumers' ability to pay will decrease. However, if the actual curve 204 is at a lower value than the equilibrium curve 202 and the residual curve 302 has a negative slope, then the process 100 predicts that NCOs will decrease and consumers' ability to pay will increase.

For example, when the process 100 predicts that NCOs will increase, lenders can offer at-risk consumers lower, fixed interest rates. This alleviates some of those consumers' financial distress and thereby enables them to pay down their debt and remain financially stable. Also, for at-risk consumers whose balance has yet to reach the credit limit, the lenders can reduce credit limits. This will mitigate any future NCOs that may result from a failure to repay. Still yet, the lenders can offer credit-protection products, such as insurance, to consumers whose accounts are at risk of failure to repay. In addition to mitigating NCOs, the aforementioned prophylactic credit treatments protect customers' credit ratings. Furthermore, it should be appreciated that when the process 100 predicts that NCOs will decrease lenders can increase revenue by increasing consumers' credit lines and by issuing new revolving credit accounts.

FIG. 4 illustrates a computer-based NCO prediction system 400 in which the process 100 is implemented, according to one embodiment of the invention. As illustrated in FIG. 4, the NCO prediction system 400 generally includes a NCO prediction server 410 communicably coupled to one or more user terminals 420 and one or more administrator terminals 430 via a network 405. In one embodiment, the user and administrator terminals 420, 430 include personal computers or mobile terminals that communicate with the NCO prediction server 410 using the Internet and a web browser application.

As further illustrated in FIG. 4, the NCO prediction server 410 includes a processor 440 operatively coupled to a communication interface 450 and a datastore 460. The processor 440 executes the process 100 and graphically displays outputs on the graphical user interface of the user terminal 420. The communication interface 450 communicates information to and from the network 405 and, in some embodiments, to and from users and administrators. The datastore 460 may include any type of computer-readable medium for storing computer-executable instructions, such as the process 100, and for storing data, such as spending data, borrowing data, and NCO data. The processor 440 is configured to execute the computer-executable instructions stored in the memory system 460 and, thereby, use the communication interface 450 to communicate information to and from the user and administrator terminals 420, 430 and store or retrieve information in the memory system 460.

It should be appreciated that the communication network 405 could be a wide area network, including the Internet, a local area network or intranet, a wireless network, etc. It should also be appreciated that when components are described herein as communicating over a network, the components may be directly coupled to each other, or indirectly coupled via one or more other components.

Furthermore, although the NCO prediction system 400 is described herein as comprising separate components, these components need not be separate and distinct from one another, and two or more of such components may, in some embodiments, be combined into a single component that performs all of the functions of the multiple components so combined as described herein. For illustrative convenience, embodiments of the present invention are described herein where the user terminal 420 and the administrator terminal 430 constitute a part of the customer-evaluation system 400. It should be appreciated, however, that the NCO prediction system 400 is not limited to a system that includes these components.

As will be appreciated by one of skill in the art, embodiments of the invention may include a method (including a business process), system, computer program product, or a combination of the foregoing. Accordingly, some embodiments of the present invention or portions thereof may even take the form of an entirely hardware embodiment, an entirely software embodiment (including firmware, resident software, micro-code, etc.), or an embodiment combining software and hardware aspects that may, in some instances, be referred to herein as a "system." Furthermore, embodiments of the present invention, or portions thereof, may take the form of a computer program product on a computer-readable medium having computer-usable program code embodied in the medium.

In such embodiments, any suitable computer-readable medium may be utilized. The computer-readable medium may be, for example but not limited to, an electronic, magnetic, optical, electromagnetic, infrared, or semiconductor system, apparatus, or device. More specific examples of the computer-readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Computer program code for carrying out operations of embodiments of the present invention may be written in an object-oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that at least some blocks of the flowchart illustrations and/or block diagrams, and/or combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture, including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computer-implemented method, comprising:
   receiving data taken across an aggregate of a plurality of consumers, wherein the data comprises:
      a total spending amount for the aggregate of the plurality of consumers; and
      a total debt amount for the aggregate of the plurality of consumers;
   determining, by one or more processing devices, a value of a ratio, wherein the ratio comprises a comparison of a value of a logarithm of the total debt amount over the period of time for the aggregate of the plurality of consumers to a value of a logarithm of the total spending amount over the period of time for the aggregate of the plurality of consumers;
   determining, by the one or more processing device, an equilibrium curve of the ratio that compares the value of the logarithm of the total debt amount over the period of time for the aggregate of the plurality of consumers to the value of the logarithm of the total spending amount over the period of time for the aggregate of the plurality of consumers;
   comparing the value of the ratio to the equilibrium curve of the ratio;
   when the one or more processing devices determine that the value of the ratio is greater than the equilibrium curve of the ratio, providing an indication that consumer leverage is increasing;
   when the one or more processing devices determine that the value of the ratio is less than the equilibrium curve of the ratio, providing an indication that consumer leverage is decreasing; and
   adjusting credit exposure of a financial institution based at least in part on the indication that consumer leverage is increasing or the indication that consumer leverage is decreasing.

2. The computer-implemented method of claim 1, further comprising computer readable medium comprising computer program code is specifically configured to cause one or more computer processing devices to perform the following operations when performing the computer program code:
   when the one or more processing devices determine that the value of the ratio is greater than the equilibrium curve of the ratio, providing a predictive indication that consumer net non-collectables will increase; and
   when the one or more processing devices determine that the value of the ratio is less than the equilibrium curve of the ratio, providing a predictive indication that consumer net non-collectables will decrease.

3. The computer-implemented method of claim 2, wherein the total spending amount for the plurality of consumers represents an aggregated personal consumption expenditures for the plurality of consumers.

4. The computer-implemented method of claim 3, wherein the total debt amount for the plurality of consumers represents an aggregated revolving credit outstanding for the plurality of consumers.

5. The computer-implemented method of claim 4, wherein the aggregated revolving credit outstanding for the plurality of consumers and the aggregated personal consumption expenditures for the plurality of consumers are received on a monthly basis.

6. The computer-implemented method of claim 5, wherein the value of the logarithm of the total debt amount for the plurality of consumers is determined by calculating a monthly rate of change of the aggregated revolving credit outstanding for the plurality of consumers.

7. The computer-implemented method of claim 5, wherein the value of the logarithm of the total spending amount for the plurality of consumers is determined by calculating a monthly rate of change of the aggregated personal consumption expenditures for the plurality of consumers.

8. A system comprising:
   a database for storing data taken from a plurality of consumers, wherein the data comprises:
      a total debt amount for an aggregate of the plurality of consumers over a period of time; and
      a total spending amount for the plurality of consumers over a period of time;
   a processor associated with the database and configured to execute an application for prediction consumer net non-collectables;
   wherein the application when executed by the processor causes the processor to:
      determine a value of a ratio, wherein the ratio comprises a comparison of a value of a logarithm of the total debt amount over the period of time for the aggregate of the plurality of consumers to a value of a logarithm of the total spending amount over the period of time for the aggregate of the plurality of consumers;

determine an equilibrium curve of the ratio that compares the value of the logarithm of the total debt amount over the period of time for the aggregate of the plurality of consumers to the value of the logarithm of the total spending amount over the period of time for the aggregate of the plurality of consumers;

compare the value of the ratio to the equilibrium curve of the ratio;

when the one or more processing devices determine that the value of the ratio is greater than the equilibrium curve of the ratio, providing an indication that consumer leverage is increasing;

when the one or more processing devices determine that the value of the ratio is less than the equilibrium curve of the ratio, providing an indication that consumer leverage is decreasing; and adjust credit exposure of a financial institution based at least in part on the indication that consumer leverage is increasing or the indication that consumer leverage is decreasing.

9. The system of claim 8, further comprising:

when the application executed by the one or more processing devices determine that the value of the ratio is greater than the value of the equilibrium of the ratio, providing a predictive indication that consumer net non-collectables will increase; and when the application executed by the one or more processing devices determine that the value of the ratio is less than the value of the equilibrium of the ratio, providing a predictive indication that consumer net non-collectables will decrease.

10. The system of claim 9, wherein the total spending amount for the plurality of consumers represents an aggregated personal consumption expenditures for the plurality of consumers.

11. The system of claim 10, wherein the total debt amount for the plurality of consumers represents an aggregated revolving credit outstanding for the plurality of consumers.

12. The system of claim 11, wherein the aggregated revolving credit outstanding for the plurality of consumers and the aggregated personal consumption expenditures for the plurality of consumers are received on a monthly basis.

13. The system of claim 12, wherein the value of the logarithm of the total debt amount for the plurality of consumers is determined by calculating a monthly rate of change of the aggregated revolving credit outstanding for the plurality of consumers.

14. The system of claim 12, wherein the value of the logarithm of the total spending amount for the plurality of consumers is determined by calculating a monthly rate of change of the aggregated personal consumption expenditures for the plurality of consumers.

15. A computer program product configured to predict consumer net non-collectables, the computer program product comprising a non-transitory computer-readable medium having computer-readable program instructions stored therein, wherein the computer-readable program instructions comprise:

instructions configured to receive data taken across a plurality of consumers, wherein the data comprises:
a total spending amount for the plurality of consumers; and
a total debt amount for the plurality of consumers;

instructions configured to determine a value of a ratio, wherein the ratio comprises a comparison of a value of a logarithm of the total debt amount over the period of time for the aggregate of the plurality of consumers to a value of a logarithm of the total spending amount over the period of time for the aggregate of the plurality of consumers;

instructions configured to determine an equilibrium curve of the ratio that compares the value of the logarithm of the total debt amount over the period of time for the aggregate of the plurality of consumers to the value of the logarithm of the total spending amount over the period of time for the aggregate of the plurality of consumers;

instructions configured to compare the value of the ratio to the equilibrium curve of the ratio;

instructions configured to provide an indication that consumer net non-collectables will increase when the value of the ratio is greater than the equilibrium curve of the ratio; and instructions configured to provide an indication that consumer non-collectables will decrease when the value of the ratio is less than the equilibrium curve of the ratio; and instructions configured to adjust credit exposure of a financial institution based at least in part on the indication that consumer leverage is increasing or the indication that consumer leverage is decreasing.

16. The computer program product of claim 15, wherein the total spending amount for the plurality of consumers represents an aggregated personal consumption expenditures for the plurality of consumers.

17. The computer program product of claim 16, wherein the total debt amount for the plurality of consumers represents an aggregated revolving credit outstanding for the plurality of consumers.

18. The computer program product of claim 17, wherein the aggregated revolving credit outstanding for the plurality of consumers and the aggregated personal consumption expenditures for the plurality of consumers are received on a monthly basis.

19. The computer program product of claim 18, wherein the value of the logarithm of the total debt amount for the plurality of consumers is determined by calculating a monthly rate of change of the aggregated revolving credit outstanding for the plurality of consumers.

20. The computer program product of claim 18, wherein the value of the logarithm of the total spending amount for the plurality of consumers is determined by calculating a monthly rate of change of the aggregated personal consumption expenditures for the plurality of consumers.

* * * * *